United States Patent Office 3,359,321
Patented Dec. 19, 1967

3,359,321
(PERFLUORODIOXOCYCLOALKYL)
PHOSPHONIUM BETAINES
Samuel E. Ellzey, Jr., New Orleans, La., assignor to the United States of America as represented by the Secretary of Agriculture
No Drawing. Filed Sept. 29, 1964, Ser. No. 400,280
8 Claims. (Cl. 260—590)

ABSTRACT OF THE DISCLOSURE (Perfluorodioxocycloalkyl) triphenylphosphonium betaines, with utility in reducing the flammability of cellulosic fabrics and as heat transfer media in the fused state, are prepared by the reaction of triphenyl phosphine and chlorofluoro cyclic olefins.

A nonexclusive, irrevocable, royalty-free license in the invention herein described, throughout the world for all purposes of the United States Government, with the power to grant sublicenses for such purposes, is hereby granted to the Government of the United States of America.

The present invention relates to (perfluorodioxocycloalkyl) triarylphosphonium betaines useful as heat transfer media in the fused state and for reducing the flammability of cellulosic fabrics.

More specifically, the invention relates to the preparation of these novel compounds.

As used herein, the term (perfluorodioxocycloalkyl)triarylphosphonium betaines includes novel cyclic fluorine compounds in which there is present a quaternary phosphorus atom bound to a cycloalkyl moiety substituted with fluorine atoms. The general formula for this class of compounds is

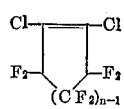

where R, R′ and R″ are phenyl and $n$ is 1 or 2.

When $n$ is 1, $n-1$ is zero, and the ring has four members. When $n$ is 2, $n-1$ is 1 and the ring has five members.

These novel cyclic fluorine compounds may be prepared by reacting at least one molar proportion of a chlorinated cyclic fluorinated olefin of the type

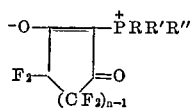

with at least one molar proportion of triphenylphosphine in a suitable solvent in the presence of water. The preparation of these compounds may be better understood by reference to the following reaction sequence which is shown for the reaction of 1,2-dichlorotetrafluorocyclobutene and triphenyl phosphine. It is to be understood that this process is illustrative only and I am not limiting my invention to this process. The reaction sequence follows:

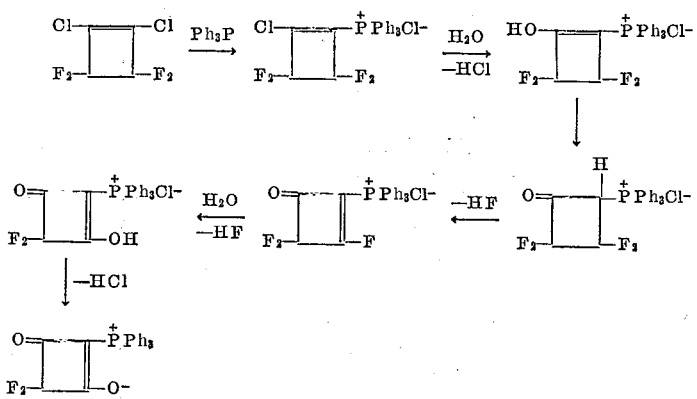

From the above sequence it may be seen that the reaction theoretically requires that one mole of the phosphine be used per mole of olefin and that four moles of a hydrogen halide (as HCl or HF) are evolved during the reaction. When the phosphine is basic enough to form stable salts with hydrogen halides it will be necessary to use enough of the phosphine to allow for this salt formation (up to five moles per mole of olefin will be required). In the case of the weakly basic phosphines such as triphenylphosphine, no such stable salts are formed and one mole of phosphine is sufficient to allow the desired betaine to be formed.

It may be seen that the theoretically required amount of water is two moles per mole of olefin used; the use of a larger amount does no harm, although it may lower the solubility of the reactants in the solvent used.

Acetic acid is the preferred solvent for the reaction since its acidic properties reduce tar formation which may occur when alcohol, benzene, or the like, are used as solvent.

A reaction temperature from about room temperature to about 150° (all temperatures are degrees centigrade) or higher may be used but the temperature of boiling glacial acetic acid is preferred and convenient.

A reaction time of several minutes to several hours may be used in the practice of this invention. The higher the value of n in the starting olefin, the less reactive is the olefin and the longer must be the reaction time necessary to obtain the betaines.

The phosphonium betaines prepared according to the present invention have high thermal stability due to the presence of the ionic phosphonium salt structure. They may be used as heat transfer media in the fused state. To illustrate this stability it was found that when the betaine prepared from the cyclobutene was heated for one hour at 295° under 3–3.5 mm. pressure no decomposition occurred but the betaine merely distilled. When applied to cotton fabric from solution the betaines impart a certain amount of flame resistance to the fabric which, when carbonized, leaves a black ash without an afterglow. The ash still has some strength, unlike the ash obtained from untreated cotton fabric.

The following examples are given by way of illustration and should not be construed as limiting the scope of this invention. Other embodiments of the practice of this invention will be readily apparent to those skilled in the art.

EXAMPLE 1

A mixture of 7.08 g. (0.027 mole) of triphenylphosphine, 4.87 g. (0.025 mole) of 1,2-dichlorotetrafluorocyclobutene, and 1 ml. of water in 50 ml. of glacial acetic acid was refluxed one hour. For about 30 minutes HCl and HF were smoothly evolved. The cooled mixture was poured into 150 ml. of water, cooled in an ice bath, and the filtered solid was washed with water. The dried crude product weighed 5.93 g., M.P. 165–220°. After washing with ether the product weighed 4.39 g. (46% yield), M.P. 227–233°. After recrystallization from aqueous acetone the pure (3,3-difluoro-2,4-dioxocyclobutyl)triphenylphosphonium betaine melted at 235–236°.

*Analysis.*—Calcd. for $C_{22}H_{15}F_2O_2P$: C, 69.47; H, 3.98; F, 9.99; P, 8.14; mol wt. 380.3. Found: C, 70.11; H, 4.09; F, 8.77; P, 7.64; mol. wt. 387 (osmometric in acetone).

EXAMPLE 2

A mixture of 7.08 g. (0.027 mole) of triphenylphosphine, 6.12 g. (0.025 mole) of 1,2-dichlorohexafluorocyclopentene, 1 ml. of water, and 5 ml. of glacial acetic acid was refluxed for 10 hours. HCl and HF were evolved after about 30 minutes at reflux. The cooled mixture was poured into 150 ml. of water and a yellow oil separated. After addition of 175 ml. of ether and 50 ml. of water, the separated aqueous layer was extracted three times with 50 ml. portions of ether. The combined ether layers were washed with water and evaporated on a steam bath to give an oily residue. Recrystallization from aqueous ethanol gave 3.86 g. (36% yield) of a white solid, M.P. 157–164°. Further recrystallizations gave pure (3,3,4,4-tetrafluoro-2,5-dioxocyclopentyl)triphenylphosphonium betaine, M.P. 179–180°.

*Analysis.*—Calcd. for $C_{23}H_{15}F_4O_2P$: C, 64.19; H, 3.51; F, 17.66; P, 7.20; mol. wt. 430.3. Found: C, 64.47; H, 3.70; F, 17.60; P, 7.21; mol. wt. 429 (osmometric in acetone).

EXAMPLE 3

In a 10% (w./w.) solution of 3,3,4,4-tetrafluoro-2,5-dioxocyclopentyl)triphenylphosphonium betaine in N,N-dimethylformamide was immersed several pieces of 68 x 72 bleached and scoured cotton printcloth. The wet fabric was then dried at 100° in an oven. When the treated samples were carbonized they left no afterglow. The black ash retained its original fabric form and possessed some strength.

I claim:

1. A process for preparing (perfluorodioxocycloalkyl)triphenylphosphonium betaines which process comprises the following steps:

(a) reacting at least one molar proportion of a chlorinated cyclic fluorinated olefin of the type

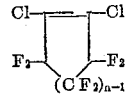

in which n is 1 or 2 with at least one molar proportion a triphenylphosphine, in the presence of a lower alkanoic acid and at least two moles of water per mole of olefin, (b) continuing the reaction until the evolution of hydrogen halides is complete, (c) precipitating the betaine by diluting the alkanoic acid solution with an excess of water, (d) washing the precipitated betaine to remove the alkanoic acid, and (e) recovering the precipitated betaine.

2. The composition

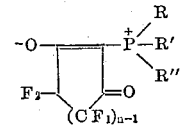

in which R, R', and R" are phenyl and n is 1 or 2.

3. The process according to claim 1 wherein the lower alkanoic acid is glacial acetic acid.

4. The process according to claim 1 wherein the temperature of the reaction is the reflux temperature of the mixture.

5. The process according to claim 1 wherein the olefin is 1,2-dichlorotetrafluorocyclobutene, and the lower alkanoic acid is glacial acetic acid.

6. (3,3 - difluoro - 2,4 - dioxocyclobutyl)triphenylphosphonium betaine.

7. The process according to claim 1, wherein the olefin is 1,2-dichlorohexafluorocyclopentene, and the lower alkanoic acid is glacial acetic acid.

8. (3,3,4,4 - tetrafluoro - 2,5 - dioxocylcopentyl)triphenylphosphonium betaine.

References Cited

Hudson, "Structure and Mechanism in Organic Chemistry," pp. 146 to 152 (1965).

LEON ZITVER, *Primary Examiner.*

M. JACOB, *Assistant Examiner.*